(12) United States Patent
Holbrook

(10) Patent No.: US 12,554,273 B2
(45) Date of Patent: Feb. 17, 2026

(54) FLOW CONTROL ARRANGEMENTS WITH FLOW SWITCHES, SEMICONDUCTOR PROCESSING SYSTEMS, AND FLOW CONTROL METHODS

(71) Applicant: ASM IP Holding, B.V., Almere (NL)

(72) Inventor: Glenn Holbrook, Scottsdale, AZ (US)

(73) Assignee: ASM IP Holding B.V., Almere (NL)

( * ) Notice: Subject to any disclaimer, the term of this patent is extended or adjusted under 35 U.S.C. 154(b) by 323 days.

(21) Appl. No.: 18/351,150

(22) Filed: Jul. 12, 2023

(65) Prior Publication Data

US 2024/0019879 A1     Jan. 18, 2024

Related U.S. Application Data

(60) Provisional application No. 63/389,774, filed on Jul. 15, 2022.

(51) Int. Cl.
    *G05D 7/06*            (2006.01)

(52) U.S. Cl.
    CPC .................. *G05D 7/0647* (2013.01)

(58) Field of Classification Search
    CPC ............... G05D 7/0647; G05D 7/0635; H01L 21/67017; H01L 21/67253; C23C 16/45561
    See application file for complete search history.

(56) References Cited

U.S. PATENT DOCUMENTS

| | | | |
|---|---|---|---|
| 3,617,151 A | 11/1971 | Scroggins | |
| 6,006,398 A | 12/1999 | Larson | |
| 6,692,318 B2 | 2/2004 | McBride | |
| 8,250,906 B2 | 8/2012 | Johnson | |
| 8,375,970 B2 | 2/2013 | Lautzenheiser | |
| 9,938,698 B2 | 4/2018 | Guy | |
| 10,451,289 B2 | 10/2019 | Paller | |
| 10,675,573 B2 | 6/2020 | Miller | |
| 2002/0134505 A1* | 9/2002 | Chang | C23C 16/44 118/715 |
| 2008/0099073 A1 | 5/2008 | Lauber | |
| 2014/0083613 A1* | 3/2014 | Xu | H01L 21/67017 156/345.33 |
| 2015/0380280 A1* | 12/2015 | Amiya | H01L 21/67051 137/613 |
| 2018/0033651 A1* | 2/2018 | Hayashi | H01L 21/67075 |
| 2018/0135529 A1 | 5/2018 | Portolese | |
| 2021/0292895 A1* | 9/2021 | Li | H01L 21/67017 |
| 2022/0333972 A1* | 10/2022 | Spyropoulos | G01F 15/043 |

* cited by examiner

*Primary Examiner* — Patrick C Williams
(74) *Attorney, Agent, or Firm* — Banner & Witcoff, Ltd.

(57) ABSTRACT

A flow control arrangement is provided including a housing seating inlet and outlet conduits is provided. An isolation valve is arranged within the housing and is fluidly coupled to the inlet conduit. A first flow switch with a first shutoff trigger is arranged within the housing and fluidly couples the isolation valve to the outlet conduit. A second flow switch with a second shutoff trigger is arranged outside of the housing and is fluidly separated from the first flow switch. A controller operably connects the first and second flow switches to the isolation valve to close the isolation valve when (a) flow rate of a first fluid traversing the first flow switch is greater than the first shutoff trigger, or (b) flow rate of a second fluid traversing the second flow switch is less than the second shutoff trigger. Semiconductor processing systems and flow control methods are also described.

20 Claims, 10 Drawing Sheets

FLOW CONTROL ARRANGEMENTS WITH FLOW SWITCHES, SEMICONDUCTOR PROCESSING SYSTEMS, AND FLOW CONTROL METHODS

CROSS REFERENCE TO RELATED APPLICATION(S)

This Application claims the benefit of U.S. Provisional Application 63/389,774 filed on Jul. 15, 2022, the contents of which are incorporated herein by reference.

FIELD OF INVENTION

The present disclosure generally relates to controlling fluid flows, and more particularly, to controlling the fluid flows in fluid systems containing hazardous materials, such as fluid flows containing hazardous process materials in semiconductor processing systems during the fabrication of semiconductor devices.

BACKGROUND OF THE DISCLOSURE

Fluid systems are commonly used to convey process fluids, such as to semiconductor processing systems during fabrication of semiconductor devices. In some fluid systems fluid communicated by a fluid system may contain hazardous materials, such as pyrophoric or materials known to be hazardous to human health or the environment. Such fluid systems generally include features operative to limit risks that may be associated with the hazardous material conveyed by the fluid system. For example, fluid-conveying structures like valves and gauges may be ventilated to remove hazardous material in the event that the fluid-conveying structure develops a leak. Exhausts fluids issued by semiconductor processing systems entraining potentially hazardous materials may receive an inert/diluent fluid prior to communication to the external environment. And flow rate-limiting devices such as restrictors and orifice plates may be arranged in the fluid system to limit maximum flow rate through the fluid system in unlikely event that a metering valve or similar device sticks in its fully open position.

While generally satisfactory for their intended purpose, vent flows are generally oversized in relation to the flow rate of the hazardous material communicated by the fluid system. This is because the vent flow need to be sized for the maximum flow rate of the hazardous material, such as the flow rating of the flow control device controlling flow of the fluid to the fluid destination, and not to the actual flow rate to the fluid destination during operation. In fluid systems employed to communicate hazardous materials to semiconductor processing systems, flow rate of fluid actually provided to the semiconductor processing system during processing is generally well below, and the vent flow is therefore oversized in relation to the vent fluid flow rate actually required by the fluid system, increasing cost of operating the semiconductor processing system. The same holds true of exhaust flows into which an inert/diluent fluid is introduced for hazard reduction, which are generally oversized with respect to the flow rate actually required by the exhaust flow.

One approach to limiting the flow rate of fluids containing hazardous materials is to employ a flow-limiting device along the fluid path, such as a restrictor or an orifice plate. While effective insofar as limiting the flow rate of vent flows and/or inert/diluent fluids provided to semiconductor processing systems, flow-limiting devices may complicate and/or prolong qualification or maintenance events. For example, during activities where a fluid system need provide a purge or passivation fluid to a fluid destination at a greater flow rate than that permitted by the flow-limiting device, the flow-limiting device is typically removed prior to qualification and/or maintenance event and thereafter reinstalled at the conclusion of event. The removal and replacement typically prolongs the qualification and/or maintenance event, extending the green-to-green time associated with the event.

Such systems and methods have generally been considered suitable for their intended purpose. However, there remains a need in the art for improved flow control arrangements, semiconductor processing systems, and flow control methods. The present disclosure provides a solution to this need.

SUMMARY OF THE DISCLOSURE

A flow control arrangement is provided. The flow control arrangement includes a housing seating an inlet conduit and an outlet conduit, an isolation valve, a first flow switch, and a second flow switch. The isolation valve is arranged within the housing and fluidly coupled to the inlet conduit. The first flow switch is arranged within the housing, fluidly couples the isolation valve to the outlet conduit, and has a first shutoff trigger. The second flow switch is arranged outside of the housing, is fluidly separated from the first flow switch, and has a second shutoff trigger. A controller operably connects the first flow switch and the second flow switch to the isolation valve. The controller is further responsive to instructions recorded on a memory to close the isolation valve when flow rate of a first fluid traversing the first flow switch is greater than the first shutoff trigger and close the isolation valve when flow rate of a second fluid traversing the second flow switch is less than the second shutoff trigger.

In addition to one or more of the features described above, or as an alternative, further examples of the flow control arrangement may include a first fluid source including a hazardous material connected to the inlet conduit and a second fluid source including an inert/diluent fluid connected to the second flow switch.

In addition to one or more of the features described above, or as an alternative, further examples of the flow control arrangement may include a process chamber connected to the outlet conduit and an exhaust source. The exhaust source may be connected to the process chamber and therethrough to the first flow switch. The second flow switch may connect the exhaust source to the second fluid source.

In addition to one or more of the features described above, or as an alternative, further examples of the flow switch arrangement may include that the hazardous material includes at least one of hydrogen ($H_2$) gas, a material layer precursor such as a silicon-containing material, and an etchant such as a fluorine-containing or a chlorine-containing material.

In addition to one or more of the features described above, or as an alternative, further examples of the flow control arrangement may include that the inert/diluent fluid comprises nitrogen ($N_2$) gas, argon (Ar) gas, krypton (Kr) gas, helium (He) gas, or a mixture thereof.

In addition to one or more of the features described above, or as an alternative, further examples of the flow control arrangement may include that a flow control device with a flow rating connects the first flow switch to the process chamber. The flow rating of the flow control device may be less than the first shutoff trigger of the first flow switch.

In addition to one or more of the features described above, or as an alternative, further examples of the flow control arrangement may include a gas box housing the flow control device and a vent source. The vent source may be fluidly coupled to the gas box. The vent source may be undersized in relation to the flow rating of the flow control device.

In addition to one or more of the features described above, or as an alternative, further examples of the flow control arrangement may include a tamperproof body enclosing the isolation valve and the first flow switch.

In addition to one or more of the features described above, or as an alternative, further examples may include a relay arranged outside of the housing and operably associated with the controller, a solenoid arranged within the housing and operably connected to the isolation valve, and an electrical connector seated in a wall of the housing and electrically connecting the solenoid to the relay.

In addition to one or more of the features described above, or as an alternative, further examples of the flow control arrangement may include a first flow sensor arranged within the housing and disposed in communication with the controller to provide a first flow rate to the controller.

In addition to one or more of the features described above, or as an alternative, further examples of the flow control arrangement may include that the first flow sensor is fluidly coupled to the isolation valve by the first flow switch.

In addition to one or more of the features described above, or as an alternative, further examples of the flow control arrangement may include that the first flow sensor fluidly couples the outlet conduit to the isolation valve.

In addition to one or more of the features described above, or as an alternative, further examples of the flow control arrangement may include an open panel supporting the second flow switch and a third flow switch connected to the first flow switch and supported by the open panel, the third flow switch fluidly coupled to the second flow switch.

In addition to one or more of the features described above, or as an alternative, further examples of the flow control arrangement may include that the third flow switch has a third shutoff trigger. The third shutoff trigger may be equivalent to the second shutoff trigger. The third shutoff trigger may be less than the second shutoff trigger.

In addition to one or more of the features described above, or as an alternative, further examples of the flow control arrangement may include a second flow switch lead connecting the second flow switch to the controller and a third flow switch lead connecting the third flow switch to the controller.

In addition to one or more of the features described above, or as an alternative, further examples may include a second flow sensor supported by the open panel and disposed in communication with the controller to provide a second fluid flow rate to the controller. The second flow sensor may be fluidly coupled to the second flow switch by the third flow switch. The second flow sensor may be integral with one of the second flow switch and the third flow switch.

A semiconductor processing system is provided. The semiconductor processing system includes a first fluid source and a second fluid source and a flow control arrangement as described above. The first fluid source is connected to the inlet conduit and the second fluid source is connected to the second flow switch. A flow control device with a flow rating is arranged within a gas box, is connected to the outlet conduit, and receives a vent fluid from a vent source. A process chamber is connected to the flow control device and an exhaust source is connected to the process chamber and the second flow switch. The flow rating of the flow control device is less than the first shutoff trigger to limit flow rate of a second fluid provided to the exhaust source through the second flow switch and the vent fluid provided to the gas box.

A flow control method is provided. The flow control methods includes, at a flow control arrangement as described above, receiving a first fluid including a hazardous material at the first flow switch and receiving a second fluid including an inert/diluent fluid at the second flow switch. A first fluid flow rate is acquired with the first flow switch, a second fluid flow rate is acquired with the with the second flow switch, the first fluid flow rate is compared to the first shutoff trigger, and the second fluid flow rate is compared to the second shutoff trigger. The isolation valve is closed using the controller when the first fluid flow rate of the first fluid traversing the first flow switch is greater than the first shutoff trigger, and the isolation valve using the controller when the second fluid flow rate of the second fluid traversing the second flow switch is less than the second shutoff trigger.

In addition to one or more of the features described above, or as an alternative, further examples of the flow control method may include flowing the first fluid to a flow control device having a flow rating and therethrough to an exhaust source through a process chamber as an exhaust fluid. The second fluid may be flowed to the exhaust source and the second fluid introduced into the exhaust fluid. The second fluid flow rate may be undersized relative to the flow rating the flow control device.

In addition to one or more of the features described above, or as an alternative, further examples of the flow control method may include that the flow control device is arranged within a gas box, and the method may further include providing a vent fluid to the gas box. The vent fluid may have a flow rate that is undersized relative to the flow rating of the flow control device.

This summary is provided to introduce a selection of concepts in a simplified form. These concepts are described in further detail in the detailed description of examples of the disclosure below. This summary is not intended to identify key features or essential features of the claimed subject matter, nor is it intended to be used to limit the scope of the claimed subject matter.

BRIEF DESCRIPTION OF THE DRAWING FIGURES

These and other features, aspects, and advantages of the invention disclosed herein are described below with reference to the drawings of certain embodiments, which are intended to illustrate and not to limit the invention.

It will be appreciated that elements in the figures are illustrated for simplicity and clarity and have not necessarily been drawn to scale. For example, the relative size of some of the elements in the figures may be exaggerated relative to other elements to help improve understanding of illustrated embodiments of the present disclosure.

DETAILED DESCRIPTION OF EXEMPLARY EMBODIMENTS

Figure 1:
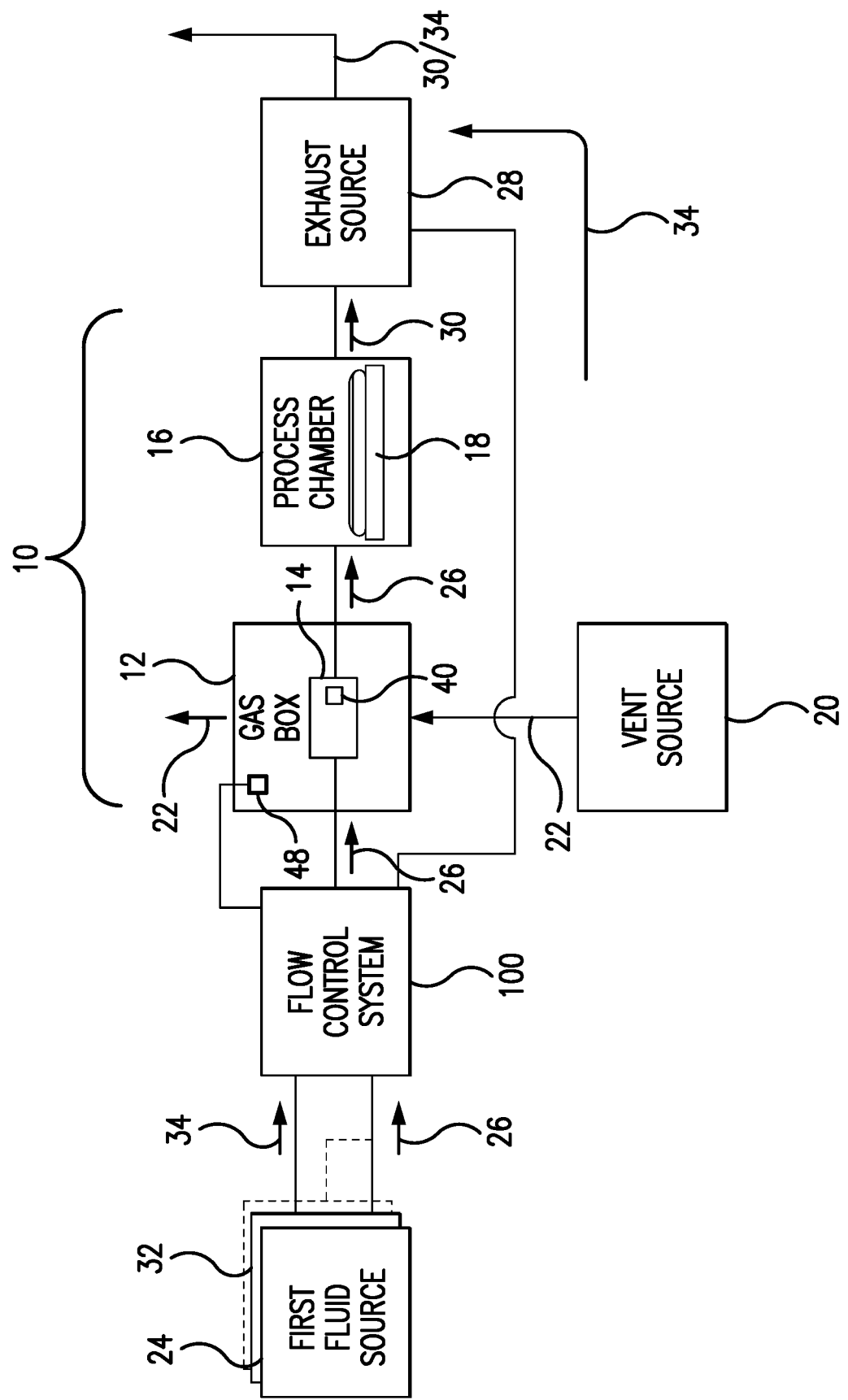
FIG. 1 is a schematic view of a semiconductor processing system and a flow control arrangement in accordance with the present disclosure, schematically showing the flow control arrangement connecting the fluid source to the semiconductor processing system.

Reference will now be made to the drawings wherein like reference numerals identify similar structural features or aspects of the subject disclosure. For purposes of explanation and illustration, and not limitation, a partial view of an example of a flow control arrangement in accordance with the present disclosure is shown in FIG. 1 and is designated generally by reference character 100. Other examples of flow control arrangements, semiconductor processing systems, and fluid control methods in accordance with the present disclosure, or aspects thereof, are provided in FIGS. 2-10, as will be described. The flow control arrangements and flow control methods described herein may be used to control the fluid flows containing hazardous materials to fluid destinations, such as fluid flows containing hazardous process materials provided to semiconductor processing systems employed to deposit material layers onto substrates during the fabrication of semiconductor processing devices, though the present disclosure is not limited to semiconductor processing systems employed for deposition of material layers onto to substrates or to semiconductor processing systems in general.

As used herein, the term "substrate" may refer to any underlying material or materials that may be used, or upon which, a device, a circuit, or a film may be formed. The "substrate" may be continuous or non-continuous; rigid or flexible; solid or porous. The substrate may be in any form such as a powder, a plate, or a workpiece. Substrates in the form of a plate may include wafers in various shapes and sizes. Substrates may be made from materials including silicon, silicon germanium, silicon oxide, gallium arsenide, gallium nitride, and silicon carbide by way of example and not for limitation.

As used herein, the term "hazardous process material" refers to a solid, liquid, or gas associated with semiconductor device fabrication that has a degree-or-hazard rating of 3 or 4 in health, flammability, instability, or water reactivity in accordance with NFPA 704 ("Standard System for the Identification of the Hazards of Materials for Emergency" 2022 Edition). Hazardous process materials may be used directly in research, laboratory, or production processes associated with semiconductor device fabrication. Hazardous process materials may be an effluent generated in connection with research, laboratory, or production processes associated with semiconductor device fabrication. Hazardous process materials may be associated with the fabrication of a semiconductor device which, as an end product, is not itself hazardous.

With reference to FIG. 1, a semiconductor processing system 10 is shown. The semiconductor processing system 10 includes a gas box 12 with a flow control device 14 and process chamber 16 with a substrate support 18. The gas box 12 is connected to a vent source 20 and is configured to receive a vent fluid 22 from the vent source 20 to ventilate an interior of the gas box 12. The flow control device 14 is arranged within the interior of the gas box 12, is connected to a first fluid source 24 to flow a first fluid 26 received from the first fluid source 24 to the process chamber 16. The process chamber 16 is connected to an exhaust source 28 (e.g., a vacuum pump) and is configured to communicate an exhaust fluid 30 (e.g., residual precursor and/or reaction products) to the exhaust source 28. The exhaust source 28 is connected to a second fluid source 32 through the flow control arrangement 100 and is configured to introduce a second fluid 34 received from the second fluid source 32 into the exhaust fluid 30. In the illustrated example the semiconductor processing system 10 is configured to deposit material layers onto substrates, e.g., a material layer 36 onto a substrate 38, supported within the process chamber 16. This is for illustration and explanation purposes only. As will be appreciated by those of skill in the art in view of the present disclosure, the flow control arrangement 100 may be employed to control fluid flow to other types of semiconductor processing systems, as well as other apparatus, configured to receive fluids.

In certain examples, the first fluid 26 may include a hazardous material. In accordance with certain examples, the first fluid 26 may include a hazardous process material (HPM). The first fluid 26 may include hydrogen ($H_2$) gas, a silicon-containing precursor like silane ($SiH_4$), or an arsenic-containing precursor such as arsine ($AsH_3$). The second fluid 34 may include an inert/diluent fluid. For example, the second fluid 34 may include nitrogen ($N_2$) gas, argon (Ar) gas, helium (He) gas, or a mixture including one of the aforementioned gases. It is contemplated that the flow control device 14 include one or more of the flow metering valve and a flow-limiting device, such as a restrictor or an orifice plate, to limit flow rate of the first fluid 26 provided to the process chamber 16 through the flow control device 14.

As has been explained above, ventilating the gas box 12 with the vent fluid 22 and introducing the second fluid 34 into the exhaust fluid 30 can reduce risk that may otherwise be associated with a hazardous material (e.g., an HPM) included in the first fluid 26. Providing the second fluid 34 to the exhaust fluid 30 can also reduce risk that may otherwise be associated with the a hazardous material including in the exhaust fluid 30. As has also been explained above, while generally satisfactory in terms of risk reduction, ventilating the gas box 12 with the vent fluid 22 and introducing the second fluid 34 into the exhaust fluid 30 adds cost to operation of the semiconductor processing system 10, generally according to flow rate of the vent fluid 22 and/or the second fluid 34. To limit such operating costs the first fluid source 24 and the second fluid source 32 are fluidly coupled to the semiconductor processing system 10 and the exhaust source 28, respectively, by the flow control arrangement 100.

Figure 2:
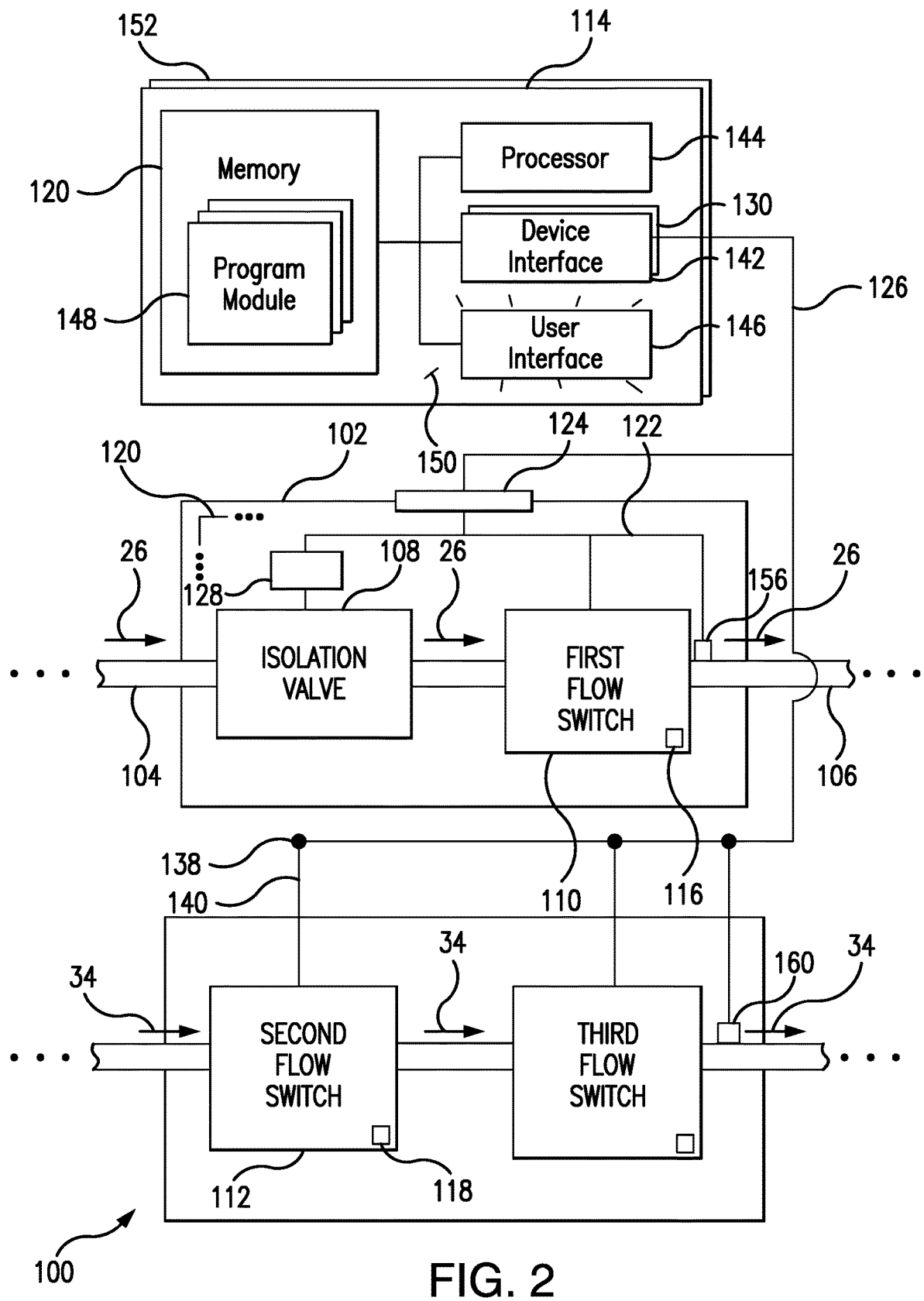
FIGS. 2 and 5 are schematic views of the flow control arrangement of FIG. 1 according to examples of the present disclosure, showing an isolation valve and flow control switches cooperating to control flow of a fluid through the flow control arrangement according to flow rates of a first fluid and a second fluid through first and second flow switches, respectively.
Figure 3:
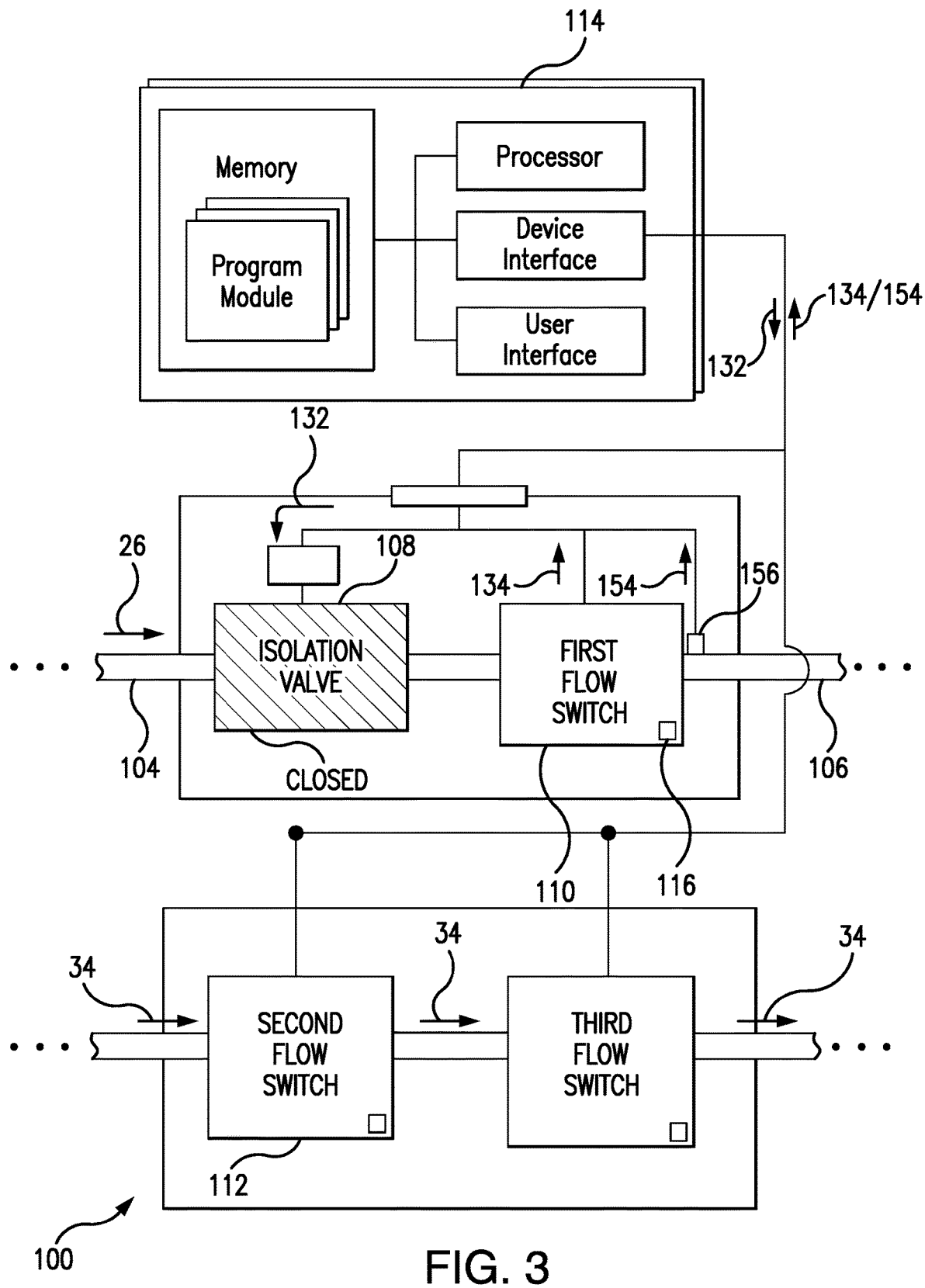
FIGS. 3 and 4 are schematic views of the flow control arrangement of FIG. 2, showing the flow switches closing the isolation valve based on flow rate of the first fluid through the first flow switch and flow rate of the second fluid through the second flow switch, respectively.
Figure 4:
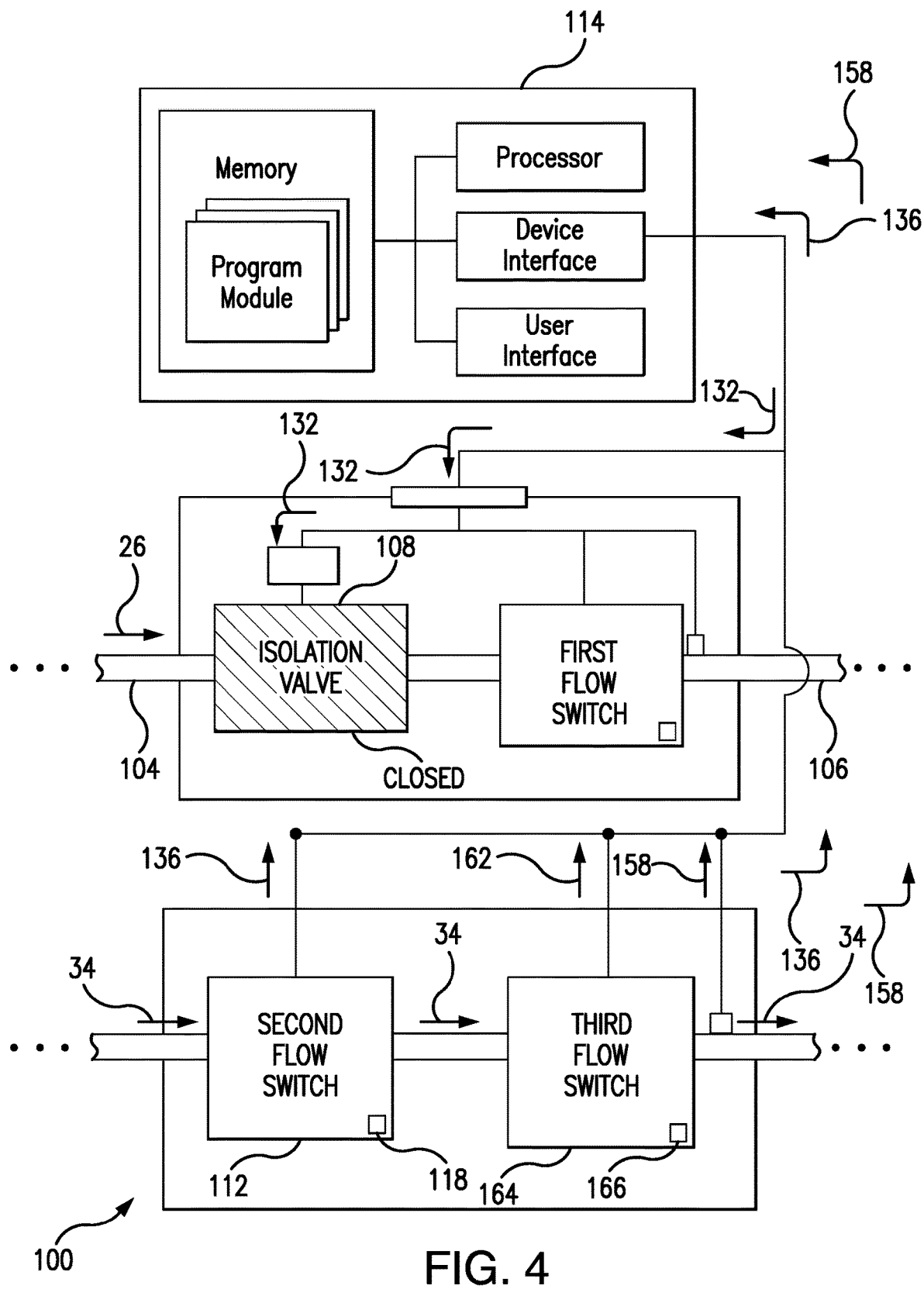

Referring to FIGS. 2-4, the flow control arrangement 100 is shown. As shown in FIG. 2, the flow control arrangement 100 includes a housing 102 seating an inlet conduit 104 and an outlet conduit 106. The inlet conduit 104 is connected to the first fluid source 24 (shown in FIG. 1) and extends into an interior of the housing 102. The outlet conduit 106 extends from within the interior of the housing to the environment external to the housing 102, and is connected to the semiconductor processing system 10. More specifically, the outlet conduit 106 is connected to the flow control device 14 (shown in FIG. 1) and therethrough to the process chamber 16 (shown in FIG. 1) to communicate the first fluid 26 to the process chamber 16.

It is contemplated that the flow control arrangement 100 also include an isolation valve 108, a first flow switch 110, a second flow switch 112, and a controller 114. The isolation valve 108 is arranged within the housing 102 and connects the inlet conduit 104 to the first flow switch 110. The first flow switch 110 is arranged within the housing 102 and connects the isolation valve 108 to the outlet conduit 106. The outlet conduit 106 extends through a wall of the housing 102 and connects the first flow switch 110 therethrough to the semiconductor processing system 10 (shown in FIG. 1). The second flow switch 112 is arranged outside of the housing 102 and connects the second fluid source 32 (shown in FIG. 1) to the exhaust source 28 (shown in FIG. 1).

The controller 114 is operably connected to the isolation valve 108 is disposed in communication with the first flow switch 110 and the second flow switch 112. It is contemplated that the first flow switch 110 have a first shutoff trigger 116, the second flow switch 112 have a second shutoff trigger 118, and that the controller 114 be responsive to instructions recorded on a memory 120 to close the isolation valve 108 (a) when flow rate of a fluid (e.g., the first fluid 26) traversing the first flow switch 110 rises above first shutoff trigger 116, or (b) flow rate of a fluid (e.g., the second fluid 34) traversing the second flow switch 112 falls below the second shutoff trigger 118. As will be appreciated by those of skill in the art in view of the present disclosure, closure the isolation valve 108 ceases flow of the first fluid 26 to the semiconductor processing system 10 (shown in FIG. 1), the flow control arrangement 100 thereby enhancing safety of the semiconductor processing system 10 by ceasing communication of hazardous material to the semiconductor processing system 10 when either insufficient vent fluid is provided to the gas box 12 (shown in FIG. 1) or insufficient inert/diluent fluid is provided to the exhaust fluid 30 (shown in FIG. 1) through the second fluid 34.

In certain examples, the housing 102 may include a tamperproof body 119. The tamperproof body 119 may enclose the isolation valve 108 and the first flow switch 110, and the second flow switch 112 may be arranged outside of the tamperproof body 119. In accordance with certain examples, the housing 102 may be formed from a metallic material, such as aluminum or stainless steel. The metallic material may enclose both the isolation valve 108 and the first flow switch 110. In accordance with certain examples, the housing 102 may include a weldment. The weldment may enclose both the isolation valve 108 and the first flow switch 110.

In certain examples, the flow control arrangement 100 may include an internal signal harness 122, an electrical connector 124, and an external signal cable 126. The internal signal harness 122 may be arranged within the housing 102 and electrically connect both the isolation valve 108 and the first flow switch 110 to the electrical connector 124. The electrical connector 124 may seated in a wall of the housing 102 and electrically connect the internal signal harness 122 to the external signal cable 126. The external signal cable 126 may in turn electrically connect the electrical connector 124, and therethrough the isolation valve 108 and the first flow switch 110, to the controller 114.

In certain examples, the flow control arrangement 100 may include a solenoid 128 and a relay 130. The solenoid 128 may be arranged with the housing 102 and configured to move a valve member supported within a valve body of the isolation valve 108 between an open position, wherein the isolation valve 108 fluidly couples the outlet conduit 106 to the inlet conduit 104, and a closed position, wherein the isolation valve 108 fluidly separates the outlet conduit 106 from the inlet conduit 104. The relay 130 may be arranged outside of the housing 102 and operatively associated with the controller 114 to energize the solenoid 128, the solenoid 128 in turn closing the isolation valve 108 when energized. In this respect the solenoid 128 may include a latching-type solenoid device. In certain examples the relay 130 may be a safety relay.

In certain examples, operable association of the isolation valve 108 with the controller 114 may be through a closure signal 132. The closure signal 132 may be provided to the isolation valve 108 through the external signal cable 126, the electrical connector 124, and the internal signal harness 122. In accordance with certain examples, the isolation valve 108 may be operably associated with both the first flow switch 110 and the second flow switch 112. In this respect provision of the closure signal 132 to the isolation valve 108 by the controller 114 may be conditioned by receipt of one of a first shutoff signal 134 from the first flow switch 110 and a second shutoff signal 136 from the second flow switch 112. It is also contemplated that, in accordance with certain examples, the isolation valve 108 may be in selective operably association with both the first flow switch 110 and the second flow switch 112. For example, provision of the closure signal 132 to the isolation valve 108 may be conditioned upon a diagnostic determination made by the controller 114 in conjunction with receipt of at least one of the first shutoff signal 134 and the second shutoff signal 136. Examples of suitable isolation valves include D211 G1/8 DN2.0 isolation valves, available from Jaksa d.o.o. of Ljubljana, Slovenia.

In certain examples, the first flow switch 110 may be configured to provide the first shutoff signal 134 when flow rate of a fluid traversing the first flow switch 110 is greater than (e.g., rises above) the first shutoff trigger 116. The first shutoff signal 134 may be communicated to the controller 114, such as through the internal signal harness 122, the electrical connector 124, and the external signal cable 126. In accordance with certain examples, flow rate of the fluid traversing the first flow switch 110 may be compared to the first shutoff trigger 116 at the first flow switch 110 (e.g., in real time with flow of the fluid), such as through a paddle member disposed within fluid or a non-contact electrical element in communication with the fluid traversing the first flow switch 110. As will also be appreciated by those of skill in the art in view of the present disclosure, real time monitoring of flow rate of the first fluid 26 as it is provided to the semiconductor processing system 10 can limit (or eliminate) risk that flow rate exceed that which can be safely ventilated by vent fluid 22 (shown in FIG. 1) provided to the gas box 12 (shown in FIG. 1) and/or the second fluid 34 introduced into the exhaust fluid 30. Examples of suitable flow switches include FS10A flow switches, available from Fluid Components International LLC of San Marcos, California.

In certain examples, the first shutoff trigger 116 may be less than a flow rating 40 (shown in FIG. 1) of the flow control device 14 (show in FIG. 1). Advantageously, sizing the first shutoff trigger 116 to be less than the flow rating 40 reduces the maximum flow rate of the first fluid 26 to the semiconductor processing system 10 (shown in FIG. 1) to less than that otherwise permitted by the flow control device 14 allows flow rate of the vent fluid 22 (shown in FIG. 1) provide to the gas box 12 (shown in FIG. 1) to be undersized relative to flow rates of the first fluid 26 greater than the first shutoff trigger 116 that could otherwise be provided to the process chamber 16 due to the flow rating 40 of the flow control device 14 being greater than the first shutoff trigger 116. It also allows the flow rate of the second fluid 34 provided to the exhaust fluid 30 (shown in FIG. 1) to be undersized relative to flow rates of the first fluid 26 greater than the first shutoff trigger 116 that could also be provided to the process chamber 16 due to the flow rating 40 of the flow control device 14 being greater than the first shutoff trigger 116. In accordance with the certain examples, the first shutoff trigger 116 may be substantially equivalent to (or slightly larger than) a maximum flow rate of the first fluid 26 required by the processing actually performed by the semiconductor processing system 10. For example, the first shutoff trigger 116 may be sized to be substantially equivalent (or slightly greater than) the maximum flow rate hydrogen ($H_2$) gas provided to the process chamber 16, such as when the hydrogen gas is employed as a carrier gas for a material layer precursor provided to the process chamber 16. As will be appreciated by those of skill in the art in view of the present disclosure, this limits flow rate of the vent fluid 22 and the second fluid 34, limiting operating cost of the semiconductor processing system 10.

It is contemplated that the second flow switch 112 be similar to the first flow switch 110 and additionally configured to provide the second shutoff signal 136 when flow rate of a fluid traversing the second flow switch 112, e.g., the second fluid 34, falls below the second shutoff trigger 118. The second shutoff signal 136 may be communicated to the controller 114 through external signal cable 126, such as through a terminal block 138 and a second flow switch lead 140. It also is contemplated that the flow rate of the fluid traversing the second flow switch 112 may be compared to the second shutoff trigger 118 at the second flow switch 112 (e.g., in real time with flow of the second fluid 34), also using a paddle member disposed within fluid or a non-contact electrical element in communication with the fluid traversing the second flow switch 112. As will also be appreciated by those of skill in the art in view of the present disclosure, real time monitoring a flow rate of the second fluid 34 can limit (or eliminate) risk that flow rate of the second fluid 34 provided to the exhaust fluid 30 (shown in FIG. 1) is insufficient in relation to the amount of hazardous material contained in the exhaust fluid 30.

In certain examples, the second flow switch 112 may be supported by an open panel 168. The open panel 168 may formed from sheet stock, such aluminum or stainless steel sheet stock. The open panel 168 may be configured to be supported by a stanchion, such as from stanchion supporting a raised metal floor in a semiconductor device fabrication facility and/or within cleanroom space. One or more union 170 may connect the second flow switch 112 to the second fluid source 32 (shown in FIG. 1) and/or the exhaust source 28 (shown in FIG. 1). As will be appreciated by those of skill in the art in view of the present disclosure, employment of the open panel 168 and/or the one or more union 170 may simplify installation of the flow control arrangement 100. As will also be appreciated by those of skill in art in view of the present disclosure, other connection arrangements may be employed and remain within the scope of the present disclosure.

In the illustrated example the controller 114 includes a device interface 142, a processor 144, a user interface 146, and the memory 120. The device interface 142 connects the processor 144 to the isolation valve 108, the first flow switch 110, and the second flow switch 112. The processor 144 is operably associated with the user interface 146 to receive user input and/or provide user output 150 therethrough, and is disposed in communication with the memory 120. The memory 120 includes a non-transitory machine-readable medium having has a plurality of program modules 148 recorded of the medium that, when ready by the processor 144, cause the processor 144 to execute certain operations. Among the operations are operations of a flow control method 300 (shown in FIGS. 9 and 10), as will be described. Although shown and described herein as having a particular architecture, it is to be understood and appreciated that the controller 114 may have different architectures in other examples, e.g., distributed architectures, and remain with the scope of the present disclosure.

In certain examples, the controller 114 may include a safety programmable logic controller (PLC) 152. As will be appreciated by those of skill in the art in view the present disclosure, employment of the safety PLC 152 allows the controller 114 to execute certain diagnostic functions. For example, the safety PLC 152 may monitor the isolation valve 108 for successful closure, for example, via analysis of the first shutoff signal 134 subsequent to provision of the closure signal 132 to the isolation valve 108 and/or by monitoring for leak through using a first flow sensor 156 arranged within the housing 102 and fluidly coupled between the isolation valve 108 and the outlet conduit 106. And the controller 114 may cooperate with a leak detector 48 (shown in FIG. 1), for example arranged within the gas box 12 (shown in FIG. 1), to close the isolation valve 108 irrespective of whether either the first shutoff signal 134 and/or the second shutoff signal 136 is provided. Examples of suitable safety PLC devices include TwinSafe® safety PLC devices, available from the Beckhoff Automation GmbH & Co. KG of Verl, Germany.

As shown in FIG. 2, when flow rate of the first fluid 26 through the first flow switch 110 is less than the first shutoff trigger 116, and flow rate of the second fluid 34 through the second flow switch 112 is greater than the second shutoff trigger 118, the flow control arrangement 100 communicates the first fluid 26 to the semiconductor processing system 10 (shown in FIG. 1). As will be appreciated by those of skill in the art in view of the present disclosure, the semiconductor processing system 10 may thereby receive the first fluid 26 and deposit the material layer 36 (shown in FIG. 1) onto the substrate 38 (shown in FIG. 1) because the flow rate of the first fluid 26 is within a range that may be rendered safe by both the flow rate of vent fluid 22 (shown in FIG. 1) to the gas box 12 (shown in FIG. 1) and the second fluid 34 introduced into the exhaust fluid 30 (shown in FIG. 1). In certain examples, the flow control arrangement 100 may ensure that flow rate of the vent fluid 22 and/or the second fluid 34 with reliability demonstrated with a SIL rating between 1 and 4, or between 2-4, or even a SIL rating of 3 or 4.

As shown in FIG. 3, when flow rate of the first fluid 26 rises above the first shutoff trigger 116, the first flow switch 110 causes the flow control arrangement 100 to cease communication of the first fluid 26 to the semiconductor processing system 10 (shown in FIG. 1). In the illustrated example communication of the first fluid 26 ceases by the first flow switch 110 providing the first shutoff signal 134 to the controller 114. Responsive to receipt of the first shutoff signal 134 the controller 114 provides the closure signal 132 to the isolation valve 108, which causes the isolation valve 108 to close. As will be appreciated by those of skill in the art in view of the present disclosure, closure of the isolation valve 108 fluidly separates the outlet conduit 106 from the inlet conduit 104, and flow the first fluid 26 to the semiconductor processing system 10 ceases prior to flow rate of the first fluid 26 creating a hazard at the gas box 12 (shown in FIG. 1) due to inadequate flow rate of the vent fluid 22 (shown in FIG. 1) and/or inadequate inert/diluent flow introduction into the exhaust fluid 30 (shown in FIG. 1) through the second fluid 34.

In certain examples, provision of the closure signal 132 responsive to receipt of the first shutoff signal 134 may conditioned by receipt of a first flow rate 154 at the controller 114. The first flow rate 154 may be provided by a first flow sensor 156 arranged within the housing 102 in communication with the first fluid 26 at a location fluidly between the isolation valve 108 and the outlet conduit 106. As will be appreciated by those of skill in the art in view of the present disclosure, employment of the first flow sensor 156 may improve the safety integrity level (SIL) rating of the flow control arrangement 100, for example, by limiting (or eliminating) nuisance tripping. In accordance with certain examples, the first flow rate 154 may be employed subsequently provision of the closure signal 132 to assess success of closure of the isolation valve 108, further improving reliability and/or the SIL rating of the flow control arrangement 100.

As shown in FIG. 4, when flow rate of the second fluid 34 falls below the second shutoff trigger 118, the second flow switch 112 also causes the flow control arrangement 100 to cease communication of the first fluid 26 to the semiconductor processing system 10 (shown in FIG. 1). In the illustrated example communication of the first fluid 26 ceases when the second flow switch 112 provides the second shutoff signal 136 to the controller 114. Responsive to receipt of the second shutoff signal 136, the controller 114 in turn provides the closure signal 132 to the isolation valve 108, the isolation valve 108 closing in response to receipt of the closure signal 132. As above, closure of the isolation valve 108 fluidly separates the outlet conduit 106 from the inlet conduit 104, and flow the first fluid 26 to the semiconductor processing system 10 ceases prior to flow rate of the first fluid 26 creating a hazard dues to inadequate inert/diluent flow introduction into the exhaust fluid 30 (shown in FIG. 1) through the second fluid 34.

In certain examples, provision of the closure signal 132 to the isolation valve 108 responsive to the receipt of the second shutoff signal 136 may be conditioned by receipt of a second flow rate 158 at the controller 114. The second flow rate 158 may be received from a second flow sensor 160 in communication with the second fluid 34 at a location fluidly between the second flow switch 112 and the exhaust source 28 (shown in FIG. 1). The second flow rate 158 may further be compared to the second shutoff trigger 118 by the controller 114, and the controller 114 may provide a user output to the user interface 146 when the comparison indicates that the second flow switch 112 has provided the second shutoff signal 136 when flow rate of the second fluid 34 is not less than the second shutoff trigger 118. As will also be appreciated by those of skill in the art in view of the present disclosure, this may also improve reliability of the flow control arrangement 100 by limiting (or eliminating) nuisance trips due to variability in flow rate of the second fluid 34, also increasing the SIL rating of the flow control arrangement 100.

In accordance with certain examples, provision of the closure signal 132 to the isolation valve 108 responsive to the receipt of the second shutoff signal 136 may be conditioned by receipt of a third shutoff signal 162 at the controller 114. The third shutoff signal 162 may be provided by a third flow switch 164 similar to the second flow switch 112 and additionally connecting the second flow switch 112 to the exhaust source 28 (shown in FIG. 1). The third flow switch 164 may have a third shutoff trigger 166, the third shutoff trigger 166 may be equivalent to the second shutoff trigger 118, and the third flow switch 164 may be configured to provide the third shutoff signal 162 to the controller 114 when flow of the second fluid 34 traversing the third flow switch 164 drops below the third shutoff trigger 166. As will further be appreciated by those of skill in the art in view of the present disclosure, requiring both the second shutoff signal 136 and the third shutoff signal 162 (i.e., agreement between the second flow switch 112 and the third flow switch 164) in order to provide the closure signal 132 may further improve reliability of the flow control arrangement 100, for example by limiting (or eliminating) nuisance trips due to variability in flow rate of the second fluid 34, also increasing the SIL rating of the flow control arrangement 100.

Figure 5:
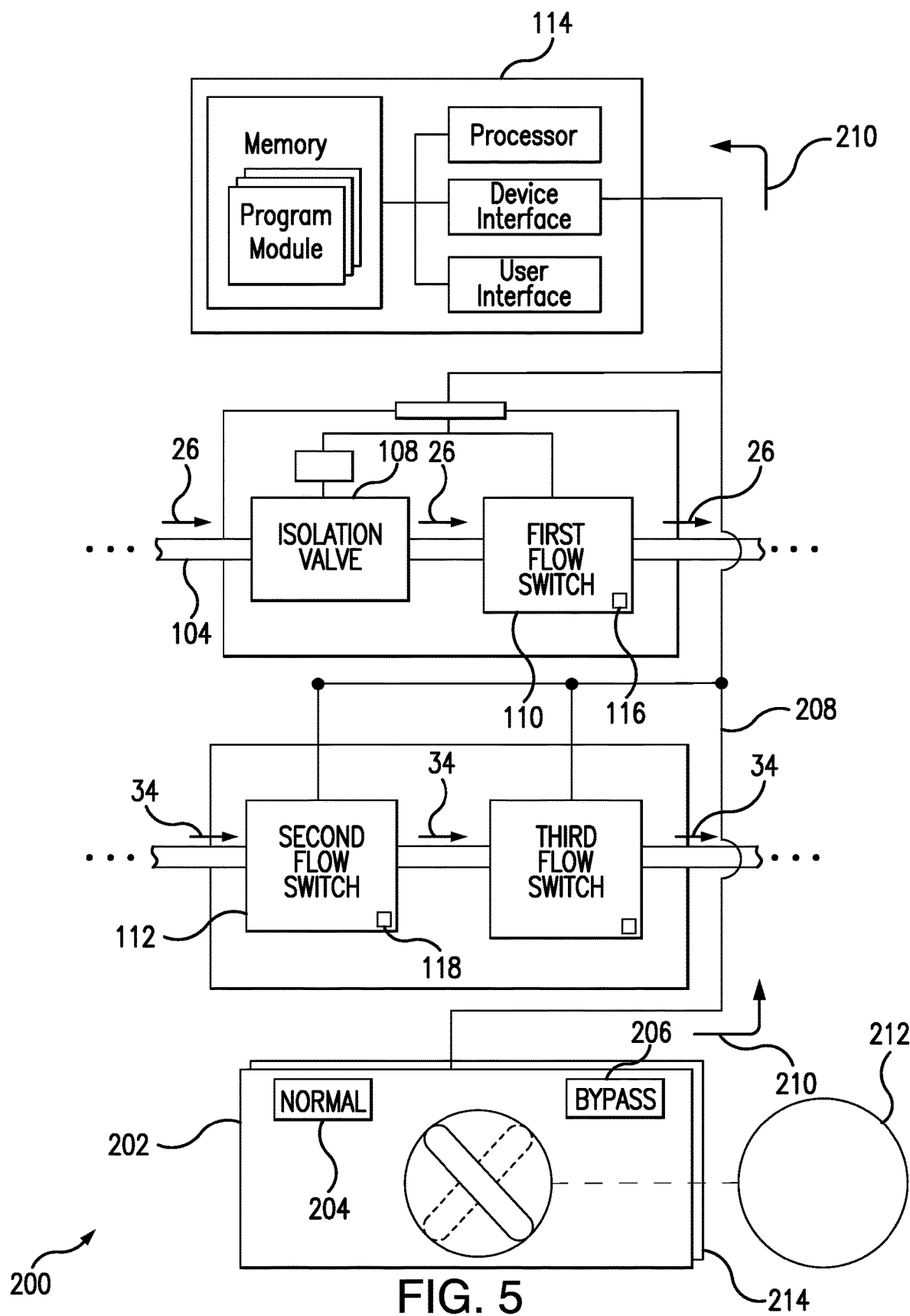

Referring to FIGS. 5-8, a flow control arrangement 200 is shown. As shown in FIG. 5, the flow control arrangement 200 is similar to the flow control arrangement 100 (shown in FIG. 1) and additionally includes a bypass switch 202. The bypass switch 202 is operably associated with the isolation valve 108 and has a first position 204 and a second position 206. When in the first position 204, the bypass switch 202 operably connects at least one of the first flow switch 110 and the second flow switch 112 to the isolation valve 108. In certain examples the bypass switch 202 may operably connect only the first flow switch 110 to the isolation valve 108 when in the first position 204. In accordance with certain examples, the bypass switch 202 may operably connect only the second flow switch 112 to the isolation valve 108 when in the first position 204. It is also contemplated that the bypass switch 202 may connect both the first flow switch 110 and the second flow switch 112 to the isolation valve 108 when in the first position 204. As will be appreciated in view of the foregoing discussion, the first fluid 26 may flow from the first fluid source 24 (shown in FIG. 1) to the semiconductor processing system 10 (shown in FIG. 1) when flow rate of the first fluid 26 is less than the first shutoff trigger 116 and flow rate of the second fluid 34 is greater than the second shutoff trigger 118.

When the bypass switch 202 is in the second position 206, the bypass switch 202 operably disconnects at least one of the first flow switch 110 and the second flow switch 112 from the isolation valve 108. In certain examples, the bypass switch 202 may operably disconnect only the first flow switch 110 from the isolation valve 108 when in the second position 206. In accordance with certain examples, the bypass switch 202 may operably disconnect only the second flow switch 112 from the isolation valve 108 when in the second position 206. It is also contemplated that, in accordance with certain examples, the bypass switch 202 may operably disconnect both the first flow switch 110 and the second flow switch 112 from the isolation valve 108 when in the second position 206. As will be appreciated by those of skill in the art in view of the present disclosure, operable disconnection of the first flow switch 110 from the isolation valve 108 allows flow rate of fluid traversing the first flow switch 110 to exceed the first shutoff trigger 116 without causing the isolation valve 108 to close. As will also be appreciated by those of skill in the art in view of the present disclosure, operable disconnection of the second flow switch 112 from the isolation valve 108 allows flow rate of the second fluid 34 to fall below the second shutoff trigger 118 without causing the isolation valve 108 to close.

In certain examples, the bypass switch 202 may be connected to the controller 114, for example, through a bypass lead 208. The bypass lead 208 may directly connect the bypass switch 202 to the controller 114. In this respect it is contemplated that the bypass switch 202 provide a bypass signal 210 to the controller 114 indicating whether the bypass switch 202 is in the first position 204 or the second position 206 in such examples.

In accordance with certain examples, the bypass switch 202 may connect at least one of the first flow switch 110 and the second flow switch 112 to the controller 114. For example, the bypass switch 202 may connect only the first flow switch 110 to the controller 114, only the second flow switch 112 to the controller 114, or both the first flow switch 110 and the second flow switch 112 to the controller 114. As will be appreciated by those of skill in the art in view of the present disclosure, connection of at least one of the first flow switch 110 and the second flow switch 112 to the controller 114 through the bypass switch 202 allows the bypass switch 202 to communicate either (or both) the first shutoff signal 134 (shown in FIG. 3) and the second shutoff signal 136 (shown in FIG. 4) when provided by the first flow switch 110 and/or the second flow switch 112, respectively, when in the first position 204. As will also be appreciated by those of skill in the art in view of the present disclosure, connection of at least one of the first flow switch 110 and the second flow switch 112 to the controller 114 through the bypass switch 202 also allows the bypass switch 202 to prevent either (or both) the first shutoff signal 134 and the second shutoff signal 136 from reaching the controller 114 when in the second position 206.

In certain examples, the flow control arrangement 200 may include a lockout-tagout (LOTO) device 212. The LOTO device 212 may be configured for mechanical affixation to the bypass switch 202. In this respect it is contemplated that the LOTO device 212 mechanically fix the bypass switch 202 in the second position 206 when mechanically affixed to the bypass switch 202, the LOTO device 212 preventing movement of the bypass switch 202 from the second position 206. As will be appreciated by those of skill in the art in view of the present disclosure, affixation of the LOTO device 212 to the bypass switch 202 while in the second position 206 prevents a user from moving the bypass switch 202 to the first position 204 absent removal of the LOTO device 212. Prevention of movement of the bypass switch 202 to the first position 204 from the second position 206 in turn prevents closure (e.g., inadvertent or erroneous closure that could otherwise give rise to a hazardous condition at the fluid destination) of the isolation valve 108 when either (or both) the first flow switch 110 and the second flow switch 112 provide the first shutoff signal 134 and the second shutoff signal 136, respectively, based on flow rate of fluid(s) traversing the first flow switch 110 and the second flow switch 112.

Figure 6:
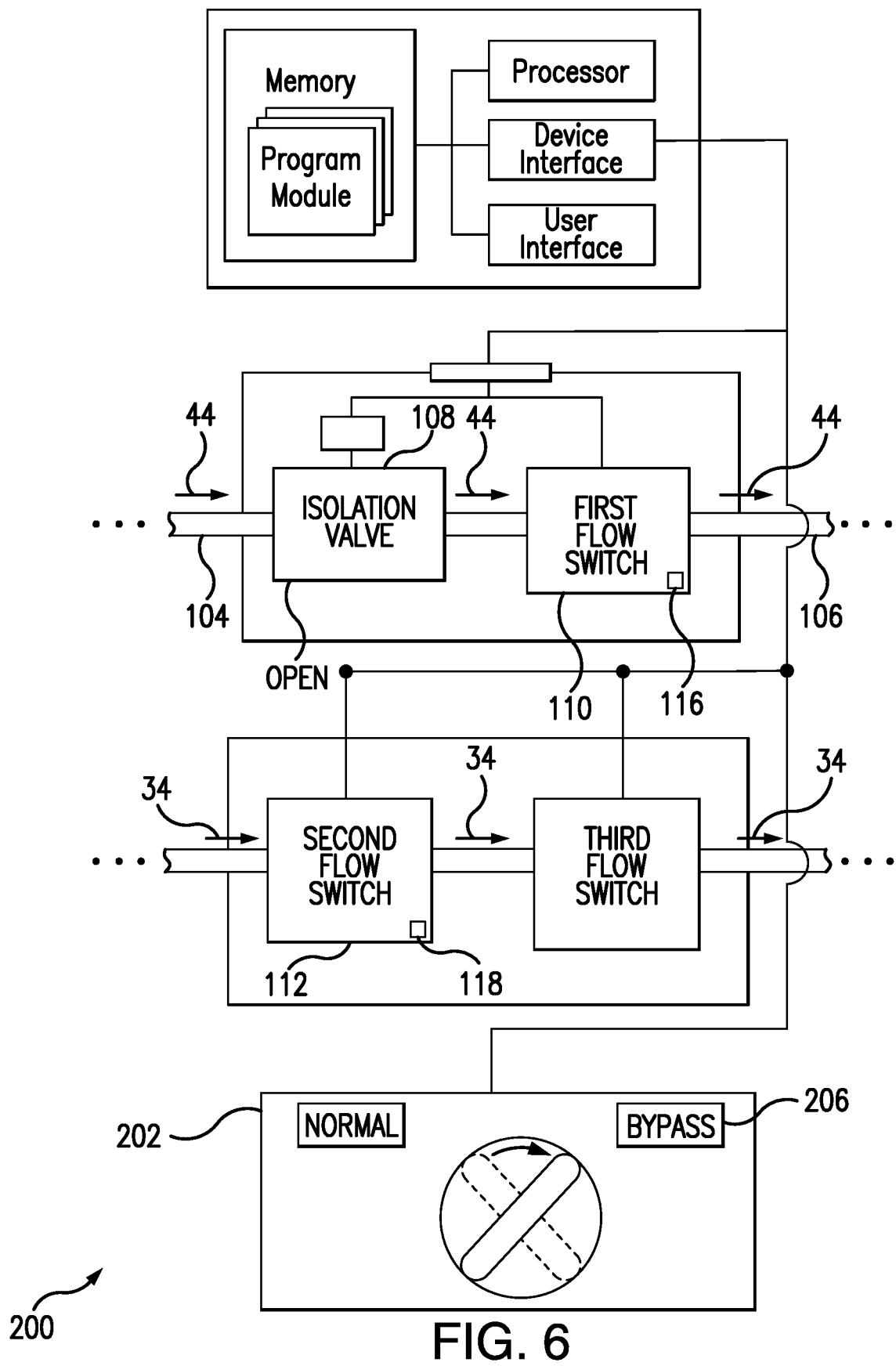
FIGS. 6-8 are schematic views of the flow control arrangement of FIG. 5, showing a bypass switch and a timing module associated with the isolation valve to condition closure upon position of the bypass switch and tolling of a predetermined time interval, respectively.

As shown in FIG. 6, when the bypass switch 202 is in the second position 206, the isolation valve 108 fluidly couples the outlet conduit 106 to the inlet conduit 104 irrespective of flow rate of a fluid through the first flow switch 110 and the second flow switch 112. For example, the flow control arrangement 200 may provide the qualification/service fluid 44 to the semiconductor processing system 10 (shown in FIG. 1) irrespective of whether flow rate of the qualification/service fluid 44 is greater than the first shutoff trigger 116. The flow control arrangement 200 may also provide a fluid traversing the first flow switch 110 (e.g. the qualification/ service fluid 44) to the semiconductor processing system 10 irrespective of whether flow of the second fluid 34 is less than the second shutoff trigger 118. For example, the bypass switch 202 may electrically disconnect at least one of the first flow switch 110 and the second flow switch 112 from the control such that neither the first shutoff signal 134 nor the second shutoff signal 136 reach the controller 114, the controller 114 thereby not providing the closure signal 132 (shown in FIG. 3) to the isolation valve 108. Alternatively, either (or both) the first shutoff signal 134 and the second shutoff signal 136 may reach the controller 114, and the instructions may cause the controller 114 to not provide the closure signal 132 to the isolation valve 108 in view of the bypass signal 210 provided to the controller 114 by the bypass switch 202.

Figure 7:
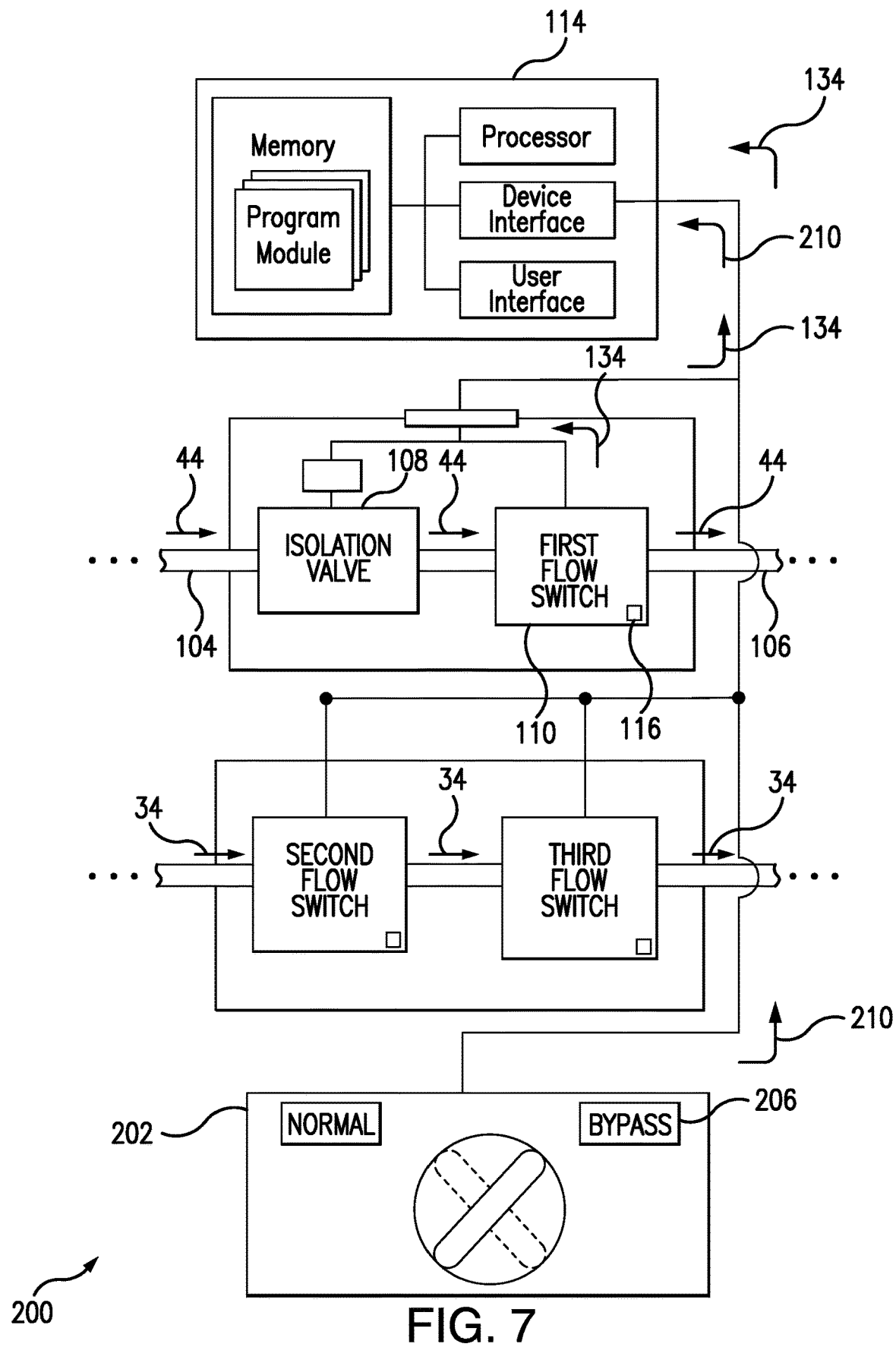

As shown in FIG. 7, the isolation valve 108 may continue to fluidly couple the outlet conduit 106 to the inlet conduit 104 notwithstanding provision of the first shutoff signal 134 by the first flow switch 110 to the controller 114 when the bypass switch 202 is in the second position 206. Advantageously, operably disconnecting the isolation valve 108 from the first flow switch 110 allows the flow control arrangement 200 to provide the qualification/service fluid 44 to the semiconductor processing system 10 at a flow rate greater than the first shutoff trigger 116. As will be appreciated by those of skill in the art in view of the present disclosure, operable disconnection of the first flow switch 110 from the isolation valve 108 using the bypass switch 202 facilitates qualification and/or service of the semiconductor processing system 10 (shown in FIG. 1) by bypassing the limitations to flow rate other imposed by the first shutoff trigger 116 without mechanical change to the semiconductor processing system 10 or fluid-conveying elements arranged between the flow control arrangement 200 and the semiconductor processing system 10, limiting time otherwise required for the qualification or service event.

Figure 8:
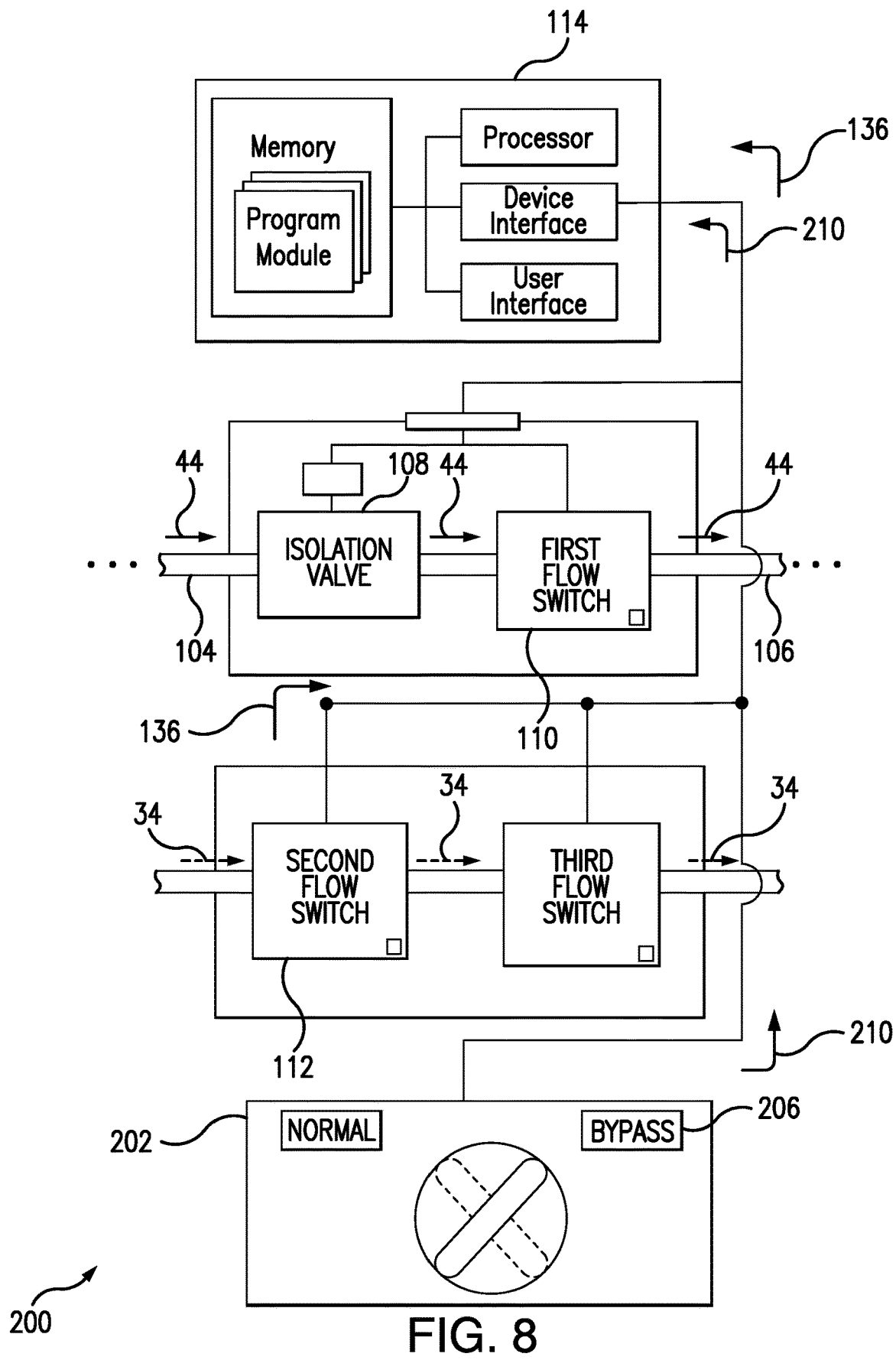

As shown in FIG. 8, the isolation valve 108 may also continue to fluidly couple the outlet conduit 106 to the inlet conduit 104 notwithstanding provision of the second shutoff signal 136 by the second flow switch 112 when the bypass switch 202 is in the second position 206. Advantageously, operably disconnecting the isolation valve 108 from the second flow switch 112 allows the flow control arrangement 200 to provide the qualification/service fluid 44 to the semiconductor processing system 10 (shown in FIG. 1) without having to simultaneously provide the second fluid 34 to the exhaust source 28 (shown in FIG. 1). As will be appreciated by those of skill in the art in view of the present disclosure, operable disconnection of the second flow switch 112 from the isolation valve 108 using the bypass switch 202 MAY facilitates qualification and/or service of the semiconductor processing system 10 by bypassing the limitations to flow rate otherwise imposed by the second shutoff trigger 118 without the cost and/or operational constraints otherwise imposed by providing the second fluid 34 to the exhaust source 28 when the second fluid 34 is not required for the qualification or service event.

With continuing reference to FIG. 5, it is contemplated that, in certain examples, the flow control arrangement 200 may include a timing module 214. The timing module 214 may be operably associated with the bypass switch 202 to restore operable connection of at least one of the first flow switch 110 and the second flow switch 112 when the bypass switch 202 in the second position 206. In this respect it is contemplated that the timing module 214 restore operable association the at least one of the first flow switch 110 and the second flow switch 112 to the isolation valve 108 when a predetermined time interval has run notwithstanding the bypass switch 202 being in the second position 206.

In certain examples, the predetermined time interval run by the timing module 214 may correspond to a time interval during which the qualification/service fluid 44 (shown in FIG. 1) be provided to the semiconductor processing system 10. For example, the qualification/service fluid 44 may include nitrogen (N$_2$) gas to purge fluid conduits fluidly coupling the second fluid source 32 (shown in FIG. 1) to the semiconductor processing system 10 (shown in FIG. 1), and the predetermined time interval may be a purge interval required for the nitrogen (N2) gas ensure that residue of the second fluid 34 (shown in FIG. 1) be adequately removed from the fluid conduits prior to maintenance. Advantageously, bypassing the isolation functionality of the first flow switch 110 and the isolation valve 108 using the bypass switch 202 and the timing module 214 can ensure that the qualification/service fluid 44 flow through the fluid conduits for the time period necessary for satisfactory purging of the fluid conduits, error proofing the purging event and avoiding use of purge gas greater than otherwise required for the purge event. In certain examples the predetermined time interval run by the timing module 214 may be about twelve (12) hours, which is a typical purge period required in some fluid systems employed to provide fluids containing hazardous materials to semiconductor processing systems.

Figure 9:
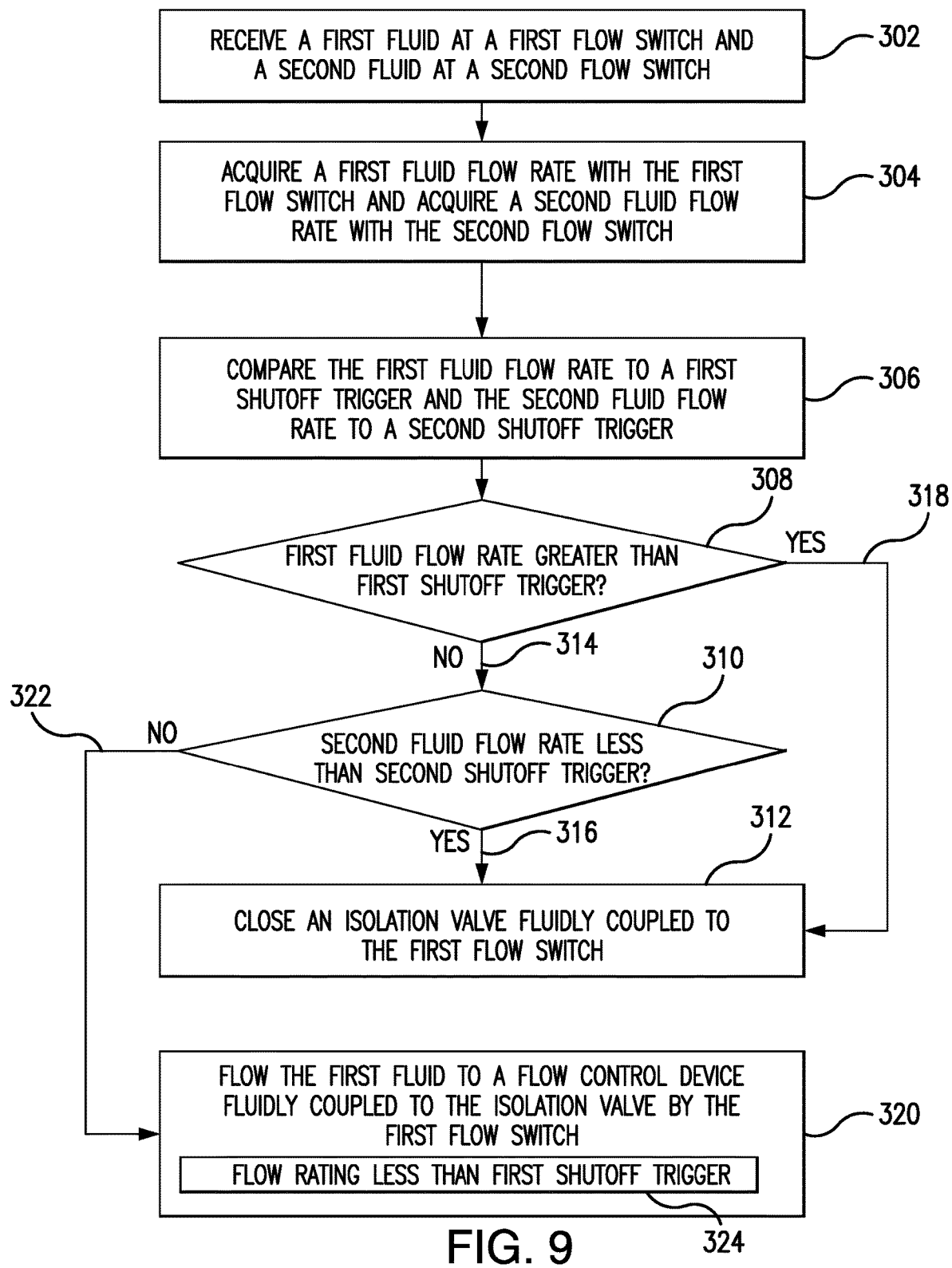
FIGS. 9 and 10 are a block diagram of flow control method, schematically showing operations of the methods according to an illustrative and non-limiting example of the method.
Figure 10:
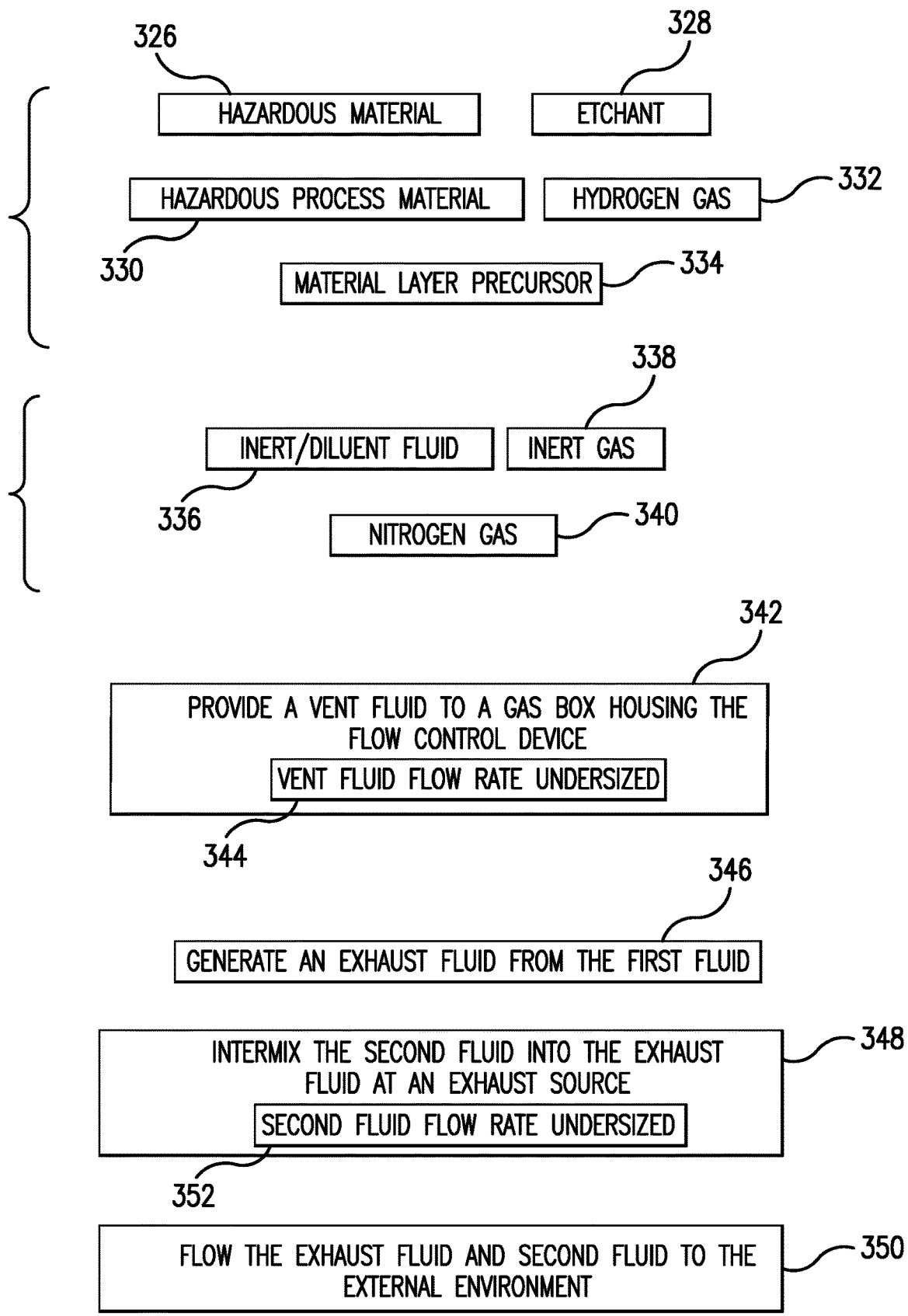

Referring to FIGS. 9 and 10, the flow control method 300 is shown. As shown in FIG. 9, the flow control method 300 includes receiving a first fluid including at first flow switch, e.g., the first fluid 26 (shown in FIG. 1) at the first flow switch 110 (shown in FIG. 2), as shown with box 302. The flow control method 300 also includes receiving a second fluid at a second flow switch, e.g., the second fluid 34 (shown in FIG. 1) at the second flow switch 112 (shown in FIG. 2), as also shown with box 302. It is contemplated that a first flow rate be acquired by the first flow switch as the first fluid traverses the first flow switch and a second fluid flow rate be acquired by the second flow switch as the second fluid traverses the second flow switch, as shown with box 304. The first flow rate is compared to a first shutoff trigger, e.g., the first shutoff trigger 116 (shown in FIG. 2), as the first fluid traverses the first flow switch, as shown with box 306. The second fluid flow rate is compared to a second shutoff trigger, e.g., the second shutoff trigger 118 (shown in FIG. 2), as the second fluid traverses the second flow switch, as also shown with box 306.

When either the first fluid flow rate is greater than the first shutoff trigger or the second fluid flow rate is less than the second shutoff trigger, an isolation valve fluid fluidly coupled to the first flow switch, e.g., the isolation valve 108 (shown in FIG. 2), is closed, as shown with boxes 308-312 and arrows 314-318. When neither the first fluid flow rate is greater than the first shutoff trigger nor the second fluid flow rate is less than the second shutoff trigger, the first fluid is flowed to a flow control device fluidly coupled to the isolation valve by the first flow switch, e.g., the flow control device 14 (shown in FIG. 1), as shown with boxes 308, 310, and 320 and arrows 314, 316, and 322. As will be appreciated by those of skill in the art in view of the present disclosure, closure of the first isolation valve ensures that flow rate of the first fluid received at a fluid destination connected to the first flow switch, e.g., the semiconductor processing system 10 (shown in FIG. 1), does not exceed a flow rate that may be rendered safe by the second fluid introduced into an exhaust flowed issued by the fluid destination, e.g., the exhaust fluid 30 (shown in FIG. 1). As will also be appreciated by those of skill in the art in view of the present disclosure, closure of the isolation valve also ensures that flow rate of the second fluid does not drop below that required to render the exhaust flow safe when flow rate of the first fluid is less than the shutoff trigger of the first flow switch. As shown with box 324, the flow control device may have a flow rating, e.g., the flow rating 40 (shown in FIG. 1), that is less than the shutoff trigger of the first flow switch, limiting operating cost of the fluid destination (e.g., the semiconductor processing system 10) by allowing flow rate of fluids provided to the fluid destination to be undersized in relation to flow rates of the fluids otherwise necessitated by the flow control device.

As shown in FIG. 10, the first fluid may include a hazardous material, as shown with box 326. The first fluid may include an etchant, as shown with box 328. The first fluid may include an HPM, as shown with box 330. The first fluid may also include a carrier gas, such as hydrogen (H2) gas, as shown with box 332, and/or a material layer precursor such as silane (SiH4) or dichlorosilane, as shown with box 334. The second fluid may include an inert/diluent fluid, as shown with box 336. The second fluid may include an inert gas such argon (Ar) gas, krypton (Kr) gas, or helium (He) gas, as shown with box 338. The second fluid may include nitrogen (N$_2$) gas, as shown with box 340.

In certain examples, the flow control method 300 may include providing a vent fluid, e.g., the vent fluid 22 (shown in FIG. 1), to the flow control device, as shown with box 342. For example, the vent flow may be provided to a gas box, e.g., the gas box 12 (shown in FIG. 1), to ventilate the flow control device for limiting risk in the unlikely event that the flow control device develops a leak. As shown with box 344, flow rate of the vent fluid may be undersized relative to the flow rating of the flow control device. In this respect the vent fluid flow rate may be insufficient to remove potentially hazardous material introduced into the gas box in the unlikely event that the flow control device develops a leak while in a fully open position absent the aforementioned cooperation of the first flow switch and the isolation valve. As will be appreciated by those of skill in the art, this ensures safe delivery of the first fluid (and hazardous material therein) while, limiting cost associated with ventilating the flow control device and/or the gas box housing the flow control device.

In certain examples, the flow control method may include generating the exhaust fluid using the first fluid, as shown with box 346. For example, the exhaust fluid may be generated during deposition of the material layer 36 (shown in FIG. 1) onto the substrate 38 (shown in FIG. 1), and may include residual material layer precursor and/or reaction products associated with the deposition process. The exhaust fluid may be communicated to an exhaust source, e.g., the exhaust source 28 (shown in FIG. 1), and intermixed therein to limit (or eliminate) hazards otherwise associated with communication of the exhaust fluid, as shown with box 348. The exhaust fluid and the second fluid may thereafter be flowed the external environment outside of the fluid destination, e.g., the external environment 46 (shown in FIG. 1) outside the semiconductor processing system 10 (shown in FIG. 1), as shown with box 350. In accordance with certain examples, flow rate of the second fluid may be undersized relative to the flow rating of the flow control device providing the fluid to the fluid destination, e.g. the flow rating 40 (shown in FIG. 1) of the flow control device 14 (shown in FIG. 1), as shown with box 352. In this respect the second fluid flow rate may be insufficient to limit risk associated with potentially hazardous material conveyed within the exhaust fluid when the flow control device is fully open absent the aforementioned cooperation of the first flow switch and the isolation valve. As will be appreciated by those of skill in the art, this ensures safe communication of the exhaust fluid (and hazardous material therein) to the external environment while, limiting cost associated with rendering the exhaust flow safe.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises," "comprising," "includes," and/or "including." when used in this specification, specify the presence of stated features, integers, steps, operations, elements, and/or components, but do not preclude the presence or addition of one or more other features, integers, steps, operations, element components, and/or groups thereof. The term "about" is intended to include the degree of error associated with measurement of the particular quantity based upon the equipment available at the time of filing the application.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A flow control arrangement, comprising:
    a housing seating an inlet conduit and an outlet conduit;
    an isolation valve arranged within the housing and fluidly coupled to the inlet conduit;
    a first flow switch with a first shutoff trigger arranged within the housing and fluidly coupling the isolation valve to the outlet conduit;
    a second flow switch with a second shutoff trigger arranged outside of the housing and fluidly separated from the first flow switch; and
    a controller operably connecting the first flow switch and the second flow switch to the isolation valve, the controller responsive to instructions recorded on a memory to:
        close the isolation valve when flow rate of a first fluid traversing the first flow switch is greater than the first shutoff trigger; and
        close the isolation valve when flow rate of a second fluid traversing the second flow switch is less than the second shutoff trigger.

2. The flow control arrangement of claim 1, further comprising:
    a first fluid source including a hazardous material connected to the inlet conduit; and
    a second fluid source including an inert/diluent fluid connected to the second flow switch.

3. The flow control arrangement of claim 2, further comprising:
    a process chamber connected to the outlet conduit and
    an exhaust source connected to the process chamber and therethrough to the first flow switch, wherein the second flow switch connects the exhaust source to the second fluid source.

4. The flow control arrangement of claim 3, wherein the hazardous material comprises at least one of hydrogen ($H_2$) gas, a material layer precursor, and an etchant.

5. The flow control arrangement of claim 3, wherein the inert/diluent fluid comprises nitrogen ($N_2$) gas, argon (Ar) gas, krypton (Kr) gas, helium (He) gas, or a mixture thereof.

6. The flow control arrangement of claim 3, further comprising a flow control device with a flow rating connecting the first flow switch to the process chamber, wherein the flow rating is less than the first shutoff trigger of the first flow switch.

7. The flow control arrangement of claim 6, further comprising:
    a gas box housing the flow control device; and
    a vent source fluidly coupled to the gas box, wherein the vent source is undersized in relation to the flow rating of the flow control device.

8. The flow control arrangement of claim 1, wherein the housing comprises a tamperproof body enclosing the isolation valve and the first flow switch.

9. The flow control arrangement of claim 1, further comprising:
    a relay arranged outside of the housing and operably associated with the controller;
    a solenoid arranged within the housing and operably connected to the isolation valve; and
    an electrical connector seated in a wall of the housing and electrically connecting the solenoid to the relay.

10. The flow control arrangement of claim 1, further comprising a first flow sensor arranged within the housing and disposed in communication with the controller to provide a first flow rate to the controller.

11. The flow control arrangement of claim 10, wherein the first flow sensor is fluidly coupled to the isolation valve by the first flow switch.

12. The flow control arrangement of claim 10, wherein the first flow sensor fluidly couples the outlet conduit to the isolation valve.

13. The flow control arrangement of claim 1, further comprising:
    an open panel supporting the second flow switch; and
    a third flow switch connected to the first flow switch and supported by the open panel, the third flow switch fluidly coupled to the second flow switch.

14. The flow control arrangement of claim 13, wherein the third flow switch has a third shutoff trigger, wherein the third shutoff trigger is equivalent to or is less than the second shutoff trigger.

15. The flow control arrangement of claim 14, further comprising:
    a second flow switch lead connecting the second flow switch to the controller; and
    a third flow switch lead connecting the third flow switch to the controller.

16. The flow control arrangement of claim 13, further comprising:
    a second flow sensor supported by the open panel and disposed in communication with the controller to provide a second fluid flow rate to the controller; and
    wherein the second flow sensor is fluidly coupled to the second flow switch by the third flow switch or is integral with one of the second flow switch and the third flow switch.

17. A semiconductor processing system, comprising:
a first fluid source and a second fluid source;
a flow control arrangement as recited in claim 1, wherein the first fluid source is connected to the inlet conduit and the second fluid source is connected to the second flow switch;
a flow control device with a flow rating arranged within a gas box and connected to the outlet conduit, the gas box receiving a vent fluid from a vent source;
a process chamber connected to the flow control device; and
an exhaust source connected to the process chamber and the second flow switch, wherein the flow rating of the flow control device is less than the first shutoff trigger to limit flow rate of a second fluid provided to the exhaust source through the second flow switch and the vent fluid provided to the gas box.

18. A flow control method, comprising:
at a flow control arrangement including a housing seating an inlet conduit and an outlet conduit, an isolation valve arranged within the housing and fluidly coupled to the inlet conduit, a first flow switch with a first shutoff trigger arranged within the housing and fluidly coupling the isolation valve to the outlet conduit, a second flow switch with a second shutoff trigger arranged outside of the housing and fluidly separated from the first flow switch, and a controller operably connecting the first flow switch and the second flow switch to the isolation valve,
receiving a first fluid including a hazardous material at the first flow switch;
receiving a second fluid including an inert/diluent fluid at the second flow switch;
acquiring a first fluid flow rate with the first flow switch and a second fluid flow rate with the second flow switch;
comparing the first fluid flow rate to the first shutoff trigger and the second fluid flow rate to the second shutoff trigger;
closing the isolation valve using the controller when the first fluid flow rate of the first fluid traversing the first flow switch is greater than the first shutoff trigger; and
closing the isolation valve using the controller when the second fluid flow rate of the second fluid traversing the second flow switch is less than the second shutoff trigger.

19. The method of claim 18, further comprising:
flowing the first fluid to a flow control device having a flow rating and therethrough to an exhaust source through a process chamber as an exhaust fluid; and
flowing the second fluid to the exhaust source and introducing the second fluid into the exhaust fluid, wherein the second fluid flow rate is undersized relative to the flow rating of the flow control device.

20. The method of claim 19, wherein the flow control device is arranged within a gas box, the method further comprising providing a vent fluid to the gas box, wherein the vent fluid has a flow rate that is undersized relative to the flow rating of the flow control device.

* * * * *